United States Patent [19]
Peterson

[11] 3,993,632
[45] Nov. 23, 1976

[54] POLYMER COMPRISING REACTION PRODUCT OF HYDROXY-TERMINATED POLYETHER AND TETRAFLUORO-HYDRAZINE

[75] Inventor: Walter Howard Peterson, Richmond, Calif.

[73] Assignee: Shell Oil Company, Houston, Tex.

[22] Filed: Aug. 17, 1962

[21] Appl. No.: 218,223

[52] U.S. Cl............................. 260/78.41; 149/19.3; 149/44; 526/12; 526/49

[51] Int. Cl.$^2$........................................ C08F 18/20
[58] Field of Search ........... 260/2, 47, 88.3, 32.6 N, 260/78.4 EP, 88.3 A; 149/19, 19.3

Primary Examiner—Leland A. Sebastian
Attorney, Agent, or Firm—Norris E. Faringer

EXEMPLARY CLAIM

1. A polymer containing high energy groups which comprises the reaction product of a hydroxy-terminated polyether prepared by polymerizing unsaturated epoxide monomers and tetrafluorohydrazine.

13 Claims, No Drawings

POLYMER COMPRISING REACTION PRODUCT OF HYDROXY-TERMINATED POLYETHER AND TETRAFLUORO-HYDRAZINE

The present invention relates to the synthesis of polymers containing high energy groups. More particularly, the invention relates to tetrafluorohydrazine adducts having high $NF_2/C$ ratios and which are especially suitable as binders for high energy solid propellants.

Specifically, the invention provides new and particularly useful high energy polymers which comprise the reaction product of a hydroxy-terminated polyether and tetrafluorohydrazine ($N_2F_4$).

There is a growing need to develop binders for solid propellants which have desirable properties such as elongation, tensile strength and castability as well as having a high $NF_2/C$ ratio. Adducts of tetrafluorohydrazine ($N_2F_4$) and polybutadiene have been prepared. While these adducts have a fairly high $NF_2/C$ ratio, they do not possess the necessary low temperature properties such as elongation and tensile strength. It has now been found that polymers prepared by reacting hydroxy-terminated polyethers with $N_2F_4$ are high energy-containing adducts which also have improved low temperature properties such as elongation and improved tensile strength. Such new polymers also have improved castability as well as high $NF_2/C$ ratios.

It is therefore an object of the present invention to provide high energy polymers. It is another object to provide polymers which have a high $NF_2/C$ ratio and are therefore especially suitable as binders for solid propellants. It is still another object to provide polymers which contain high energy oxidizing groups and which have improved low temperature properties of elongation, tensile strength and improved castability. It is a further object to provide hydroxy-terminated polyether adducts of tetrafluorohydrazine. It is still a further object to provide an ether linked polymer containing difluoramino groups and having hydroxy terminal groups which can be further reacted or cured with a multitude of compounds, such as, polyisocyanates, polyisothiocyanates, epoxides, anhydrides, polycarboxylic acid halides, and the like, to produce other useful and valuable polymeric products such as binder for propellant ingredients. It is still a further object to provide polymers having a high $NF_2$ to carbon ratio. Other objects and advantages of the invention will be apparent from the following detailed description thereof.

It has now been discovered that these and other objects may be accomplished by the useful and novel high-energy containing polymers which comprise the reaction product of a hydroxy-terminated polyether and tetrafluorohydrazine. Such high energy polymers may be either prepared by reacting unsaturated epoxide monomers with $N_2F_4$ and then polymerizing this reaction product, or by polymerizing unsaturated epoxide monomers to obtain hydroxy-terminated unsaturated polyethers which are then reacted with $N_2F_4$ to produce the polymers having high $NF_2/C$ ratios. The particular method employed depends, in general, upon the particular monomer used with the same polymeric product obtained in either case.

It has been also discovered that the polymeric products of the present invention prepared from polyethers derived from epoxy groups have improved flexibility and other improved properties of tensile strength, elongation, and castability.

It has been further discovered that, due in part, to the terminal hydroxy groups and ether groups, the novel polymers of the present invention impart flexibility and improve solid propellants when used as a binder therein. Also, because of such functionality, these polymers may be further reacted with polyisocyanates, polyisothiocyanate, dianhydrides, dicarboxylic acid halides and the like to produce new and valuable products such as polyurethanes and polyesters.

The unsaturated epoxide monomers useful for preparing the polymers of the present invention may be aromatic, aliphatic, cycloaliphatic, or heterocyclic. Examples of such unsaturated epoxide monomers include, among others, butadiene monoxide, 1,1-divinylethylene oxide, 2-furylethylene oxide, 1,2-epoxy-3,5-hexadiene, 5,6-epoxy-1,3,7,9-decatetraene, vinyl styrene oxide, 4-cyclohexeneylethylene oxide, and 1,2-divinylethylene oxide.

In general, the preferred method for preparing the high-energy containing polymers of the present invention comprises polymerizing an unsaturated epoxide monomer such as butadiene monoxide to form an unsaturated polyether which is then reacted with $N_2F_4$ to form the desired adduct having a high $NF_2/C$ ratio.

For purposes of illustration and discussion, butadiene monoxide is selected as a typical and preferred example of an unsaturated epoxide monomer.

Butadiene monoxide has from time to time been commercially available and is generally prepared by direct synthesis in a one-step epoxidation of butadiene. Because of its commercial availability, peracetic acid is usually selected as the oxidizing agent. The epoxidation is simply carried out under known conditions by adding peracetic acid (30–45% in acetic acid) slowly to an excess of butadiene in a solvent such as methylene chloride or toluene at usually about 0° C. After completion of the reaction, the mixture may be neutralized with sodium bicarbonate, dried and distilled to recover the butadiene monoxide monomer.

The butadiene monoxide monomer is then polymerized by any of the usual methods such as those disclosed in U.S. Pat. No. 2,510,540, Ballard et al. A simple and effective method comprises the polymerization of the epoxide in isopentane with $BF_3$ etherate and ethylene glycol as catalyst-initiator combination.

Although boron trifluoride, particularly as the etherate, is generally the preferred catalyst for such epoxide polymerization, other catalysts which may be used include, among others; mineral acids such as sulfuric acid and halogen acids; heavy meatl salts such as stannic chloride; sulfonic acids such as para-toluene-sulfonic acid; and basic substances such as sodium and potassium hydroxides.

The catalysts may be employed in solid, liquid or gaseous form, or may be present as an aqueous or organic solution.

Dependent upon the nature of the monomer, the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25, but a ratio of 1:100 gives satisfactory results in most circumstances.

Isopentane was found to be especially suitable and because of its commercial availability is preferred. Other solvents or diluents which may be used include, among others, dihydronaphthalenes; cycloheptane, decanes, including 2-methyl nonane and 2,6-dimethyloctane; octanes, including 2,2,3-trimethylpentane and 2-methyl-3-ethylpentane; nonanes, such as 2-methyloctane, 2,4-dimethylheptane, 4-ethylheptane; dodecanes such as dihexyl or 2,4,5,7-tetramethyloctane and the like.

Ordinarily, when the diluent is used for a liquid phase polymerization the proportions of diluent or solvent to monomer will range from about 1:1 to about 20:1 and preferably from about 2:1 to about 5:1.

In general, compounds which have active hydrogen atoms as determined by the Zerewitinoff method, J.A.C.S., Vol. 49, page 3181, 1927, are preferred initiators. Such compounds are preferably polyfunctional and include, among others, water; glycols such as ethylene glycol, 1,3-propanediol, and 1,4-butanediol and hexanetriols; erythritol; pentaerythritol; glycerol, primary or secondary amines such as ethylene diamine, trimethylenediamine, tetramethylenediamine, m-phenylene diamine, naphthalene diamines, toluene-2,4-diamine, aminobenzylaniline, and aminodiphenylamine; dicarboxylic acids such as, succinic acid; hydroxy amines, such as, for example, 2-amino-ethyl alcohol, 2-amino-1-hydroxy-napthalene, m-aminophenyl; hydroxylcarboxylic acid such as glycollic acid and alpha-hydroxy-propionic acid; and amino-carboxylic acids such as amino-acetic acid and aminobenzoic acid.

Water is an especially preferred initiator because of its short chain length and small molecular weight which, therefore, allows a maximum $NF_2/C$ ratio in the ultimate polymer. Ethylene glycol is likewise a preferred initiator for the same reasons.

The preferred polymerization temperature range is from about 25° C to about 200° C although temperatures above and below may occasionally be desired. Temperatures above 300° C are generally to be avoided.

The polymerization may be carried on under subatmospheric, atmospheric or superatmospheric pressures although from 0.1 atmospheres to about 15 atmospheres being generally preferred with from about 0.5 atmosphere to about 2 atmospheres being especially preferred.

Following the polymerization period, which may range from about an hour to 20 hours or more, the product may be purified by removing catalyst, solvent and water followed by decoloration. Suitable techniques are described in U.S. Pat. No. 2,510,540, issued June 6, 1950.

The poly(butadiene monoxide) polymer has the following structure when ethylene glycol is used as the initiator:

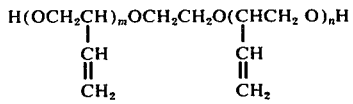

The molecular weight of this polymer was determined at about 1000 and an actual hydroxyl functionality of about 1.6–1.7 groups per molecule. By using glycerol as an initiator, the hydroxyl functionality is raised to about 2.3.

The poly(butadiene monoxide) so produced is then reacted with $N_2F_4$ so as to obtain the maximum conversion of double bonds to vicinal bis(difluoramino) groups. The usual and preferred method comprises adding $N_2F_4$ gas to a reactor containing the poly(butadiene monoxide) in a suitable solvent at ambient temperatures. Thereupon, the pressure is increased about 50 psi at 5 minute intervals until a working pressure of say, 500 psi is reached. Generally, the temperature is also raised from ambient to about 80° C, with both temperature and pressure being maintained throughout the reaction period.

Another suitable method comprises injecting the poly(butadiene monoxide) into a reactor which is already under $N_2F_4$ pressure, say 500 psi. In general, the reactors inner surfaces are constructed of either glass or steel, although other materials may be employed if desired. Using this method, the olefin feed may be introduced into the vapor space as by spraying upon the wall or may be introduced beneath a stirred solvent-$N_2F_4$ layer (feed injection).

The temperatures employed normally range from about 40° C to about 120° C with temperatures lower and higher sometimes used. The preferred temperature range is from about 60° C to about 100° C.

In general, pressures above 100 psi are required with pressures of 500 psi and above generally being preferred in order to reduce cyclization.

Reaction times may vary from about an hour to about 20 hours or more. Usually, however, the reaction is essentially complete, say 80% based upon olefin reacted, after 2 or 3 hours with from 15–20 hours additional required to effect 90% to 92% olefin reacted.

Suitable solvents or diluents include, among others; carbonyl compounds such as ketones, as for example, acetone, methyl ethyl ketone, methyl isbutyl ketone, methyl n-butyl ketone, methyl n-propyl ketone, diisobutyl ketone, and methyl n-amyl ketone; ethers, such as for example, ethylene glycol monomethyl ether (methyl Cellosolve) ethylene glycol monoethyl ether (Cellosolve) ethylene glycol monobutyl ether (butyl Cellosolve) ethylene glycol ethylbutyl ether, ethylene glycol monophenyl ether, diethylene glycol monomethyl ether, diethyleneglycol monoethyl ether (Carbitol) diethylene glycol, monobutyl ether, diethyl ether, di-n-propyl ether, diisopropyl ether, methyl n-butyl ether, ethyl n-butyl ether, di-n-butyl ether, di-n-amyl ether, diisoamyl ether, di-n-hexyl ether, tetrahydrofuran and biphenyl; aromatic hydrocarbons such as benzene, toluene and xylenes; esters, such as, ethyl acetate, isopropyl acetate, methyl acetate, isobutyl acetate, n-butyl acetate, n-propyl acetate, sec-amyl acetate, sec-butyl acetate, butyl Cellosolve acetate, butyl lactate, Cellosolve acetate, methyl Cellosolve acetate, and methyl amyl acetate; chlorinated hydrocarbons, such as, for example, chloroform, methylene dichloride, ethylene dichloride and carbon tetrachloride; fluorocarbons, such as, sym-tetrafluorodichloroacetone and trifluorotrichloroacetone; and nitrohydrocarbons, such as, for example, nitromethane, nitroethane, and nitropropane. In general, the selection of a particular solvent is based upon many factors such as temperature, pressure, concentration, solubility, etc. The major factor in selecting is the relative solubility of the $N_2F_4$ polymer adduct. Acetone was found to be an especially preferred solvent for the reaction of $N_2F_4$ with poly(butadiene monoxide), although tetrahydrofuran, chloroform, carbon tetrachloride, ethylene dichloride and tetrafluorodichloroacetone, among others, were very suitable solvents. The dilution ratio, i.e., the ratio of poly(butadiene monoxide) to solvent, may generally range from about 1:1 to about 1:32 with from about 1:2 to about 1:16 being generally preferred.

The preparation of other high energy-containing polymers may be accomplished by the same technique hereinbefore described for the production of the PBMO-$N_2F_4$ adduct. In other words, similar suitable adducts having a high $NF_2/C$ ratio may be prepared by reacting $N_2F_4$ with a hydroxy-terminated polyether, such as, for example, polymers of the following unsaturated epoxy monomers: 1,1-divinyl ethylene oxide, 2-furyl ethylene oxide, 1,2-epoxy-3,5-hexadiene, 5,6-epoxy-1,3,7,9-decatetraene, vinyl styrene oxide, 4-cyclohexenyl ethylene oxide, and 1,2-divinylethylene oxide.

In general, the same apparatus and conditions as noted for the PBMO-$N_2F_4$ adduct are employed when another polymer of an unsaturated epoxy monomer is used.

Very suitable solid propellant binders are obtained when these $NF_2$ adducts are reacted (cured) with polyisocyanates and polyisothiocyanates such as, for example, any polyfunctional compound of the general formula $R(NCX)_{n+1}$ which may be aliphatic, cycloaliphatic or aromatic, wherein n is any interger, X is oxygen or sulfur and R is a polyvalent organic radical. Examples of isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisothiocyanate; aliphaticaromatic diisocyanates or diisothiocyanates, such as xylylene-1,4-diisocyanate, xylylene-1,3-diisocyanate, 4,4'-diphenylenemethane diisocyanate, 4,4'-diphenylene-propane diisocyanate, xylylene-1,4-diisothiocyanate or durene diisocyanate. A difunctional organic isocyanate is preferred with aromatic diisocyanates, for example, a tolylene diisocyanate or isomeric mixtures thereof are especially preferred.

Other suitable curing agents include the epoxides, such as, for example, those organic materials which have more than one vic-epoxy group, i.e., more than one

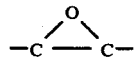

group, which group may be in a terminal position, i.e., a

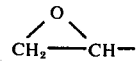

group or in an internal position, i.e., a

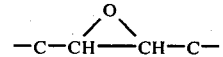

group. The polyepoxides may be saturated or unsaturated, aliphatic, cycloaliphatic, aromatic or heterocyclic and may be substituted with substituents, such as chloride, hydroxyl groups, ether radicals, and the like.

Examples of such polyepoxides, include, among others, 1,4-bis(2,3-epoxypropoxy)benzene, 1,3-bis(2,3-epoxypropoxy)benzene, 4,4'-bis(2,3-epoxypropoxy)-diphenyl ether, 1,8-bis(2,3-epoxypropoxy)-octane, 1,4-bis(2,3-epoxypropoxy)cyclohexane, 4,4'-bis(2-hydroxy-3,4'-epoxybutoxy)diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, cathechol, hydroquinone, methyl resorcinol, or polynuclear phenols, such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxhexane, 3-chloro-1,2-epoxyoctane, and the like. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C to 150° C. The heating is continued for several hours to effect the reaction and the product is then washed free of salt and base.

Another group of polyepoxides comprise the polyepoxypolyethers obtained by reacting, preferably in the presence of an acid-acting compound, such as hydrofluoric acid, one of the aforedescribed halogen-containing epoxides, such as epichlorohydrin, with a polyhydric alcohol, and subsequently treating the resulting product with an alkaline component. As used herein the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitor, mannitol, pentaerythritol, polyallyl alcohol, polyvinyl alcohol, inositol, trimethylolpropane, bis(4-hydroxycyclohexyl)dimethylmethane and the like.

Further curing agents that are suitable under certain circumstances are the anhydrides, such as maleic anhydride, succinic anhydride and phthalic anhydride and the polyacyl halides such as acyl bromide and acyl chloride.

In general, in forming a binder for a solid propellant, the $NF_n$ adduct and curing agent are mixed with the solid oxidizing agent(s) and packed or cased under vacuum in an appropriate rocket motor with a removeable center core. Curing is then caused by heating at 60° C for, say, several days. Catalysts such as ferric acetylacetonate and $BF_3$-etherate may be employed when isocyanates and epoxides are used, respectively.

It is desirable to use an amount of binder that when said binder is reacted with the other components, will give the highest impulse possible. In general, this is approximately 25% by weight of binder, but may be as little as about 15%.

On the other hand, it is generally understood that with part of the oxidizer in the binder, it is no longer really necessary to use very high solid oxidizer loadings in propellant formulations. The propellant composition can be formulated to give maximum specific impulse and binder content can range from about 25% to 40% without making an apparent large change in impulse as shown in the following tabulation (pbw indicates parts by weight):

| Binder, pbw | Aluminum Powder, pbw | Ammonium Perchlorate, pbw | Impulse (Isp) Seconds |
|---|---|---|---|
| 20 | 60 | 20 | 268 |
| 25 | 60 | 15 | 270 |
| 30 | 50 | 20 | 271 |
| 35 | 50 | 15 | 272 |
| 40 | 50 | 10 | 271 |

Because of these impulse values, the amount of binder can be adjusted to give optimum physical properties more easily than was possible when oxidizer groups were not included in the binder composition.

The $NF_2$ adducts of the present invention are effective binders when used from about 10% to about 25% and higher, although about 15% to 20% as espcially effective when the propellant is a 3:1 ammonium perchlorate-aluminum mixture.

As noted hereinbefore, the $NF_2$ adducts of the present invention are especially useful as binders for high energy solid propellants when cured with an isocyanate, isothiocyanate, anhydride, acyl halide and the like. A particularly preferred curing agent is the polyfunctional isocyanates and an especially preferrred binder is a poly(butadiene monoxide)-$N_2F_4$ adduct which has been cured with a polyfunctional aromatic isocyanate.

In general, the polyisocyanate and the $NF_2$ adduct are combined in approximately chemical equivalent amounts, i.e., an amount sufficient to furnish one -(NCX) group for every hydroxyl group. It is preferred, however, to perform the curing reaction so that the ratio of total isocyanate (or isothiocyanate) groups to the total hydroxyl groups present is substantially equal to or greater than 1:1, for example, 0.9:1 to 2:1 or greater.

Generally speaking, a stoichiometric amount of the other curing agents such as the anhydrides, may be likewise employed although an excess of either the $NF_2$ adduct or the curing agent may be employed if desired. Up to about a 10% excess of the curing agent is generally employed. A related high energy containing polymer which is also suitable as a solid propellant binder is polymerized 1,1,1-trinitro-3,4-epoxybutane. This monomer may be prepared by reacting silver nitroform with glycidyl iodide in methyl acetate. The polymer is, in general, similar to the preparation of BMO.

Also included in the present invention are polymers containing high energy groups which comprise the reaction product of (1) other functional-terminated polyethers such as for example, an acid-terminated, epoxy-terminated, cyanate-terminated and mercapto-terminated polyethers and (2) tetrafluorohydrazine ($N_2F_4$). In general, these functional-terminated polyethers are prepared by reacting one of the hereinbefore described hydroxy-terminated polyethers, such as poly(butadiene monoxide) with the appropriate compound. Thus, acid-terminated polyethers may be prepared by reacting a hydroxy-terminated polyether with the appropriate anhydride under known conditions. A typical example is the reaction of PBMO with maleic anhydride. This acid-terminated polyether may be then reacted with $N_2F_4$ to give an $N_2F_2$ adduct which can be cured with any curing agent suitable for curing or reacting with such end groups, such as, for example, epoxy compounds hereinbefore disclosed and phosphines such as tris[1-(2-methyl)-axiridinyl]phosphine oxide.

A cyanate-terminated polyether may likewise be prepared by simply reacting a hydroxy-terminated polyether such as PBMO with a polyisocyanate such as tolylene diisocyanate. This polymer may then be reacted with $N_2F_4$ and the resulting $NF_2$ adduct cured with an appropriate compound such as, for example, polyhydric compounds such as glycols, polyoxyalkylene polyols, glycerol and the like.

Other functional-terminated polyethers may be prepared in like manner, reacted with $N_2F_4$ and cured with suitable curing agents to provide useful binders containing high energy groups.

Advantages of the invention are illustrated by the following examples. The reactants, their proportions and other specific ingredients of the recipes are presented as being typical and various modifications can be made in view of the foregoing disclosure and discussion without departing from the spirit or scope of the disclosure or of the claims. Unless otherwise specified, parts and percentages recited in the examples are by weight.

EXAMPLE I

This example illustrates the preparation of poly(butadiene monoxide), its subsequent reaction with $N_2F_4$ in various reactors using several solvents and the properties of the resulting $N_2F_4$ adducts.

Poly(butadiene monoxide), PBMO, was first prepared by adding 8.25 g of ethylene glycol, 3.01 g $BF_3$ etherate and 1000 mls of isopentane in a 2 liter kettle and heating to reflux temperature. While maintaining reflux, 140 grams of butadiene monoxide was then added dropwise over a 70 minute period. The reactants were refluxed and stirred for 5 hours and allowed to stand over night. 60 g of alumina and 225 mls of ethylene dichloride were added and the mixture stirred for 24 hours whereupon it was filtered and the volatiles flashed and stripped in a Rinco Evaporator at 40° C and 0.6 mm vacuum. 126.3 g of poly(butadiene monoxide) were obtained having a molecular weight of 920 determined ebullioscopically in ethylene chloride. This PBMO polymer had an epoxy value of 0.007 eq/100 g, an OH value of 0.186 eq/100 g, an $I_2$ No. of 306, and contained 8.6% hydrogen and 66.3% carbon.

Approximately 2 parts by weight of the above-prepared PBMO was dissolved in about 32 parts by volume (dilution ratio of 1/16) of solvent in a reactor at ambient temperature. $N_2F_4$ gas was fed into the reactor under pressure with the pressure being increased 50 psi at 5 minute intervals until a working pressure of 500 psi was reached. The temperature was also raised to about 80° C during this time. This temperature and pressure were then maintained for the total reaction period. The results of the various runs are tabulated in Table I. The reaction products were viscous liquids ranging from light tan to dark brown, hich were very soluble in acetone and slightly soluble in carbon tetrachloride.

duct was obtained (6.30 g theoretical) having a molecular weight of 865 as determined ebullioscopically in methyl ethyl ketone and a mole ratio of $NF_2/C$ of 0.35. Approximately 98.0% of the PBMO polymer was reacted as calculated by the $I_2$ number.

The procedure was repeated using several other solvents and several dilution ratios. The pressure was about 500 psi, temperature ranged from 58°–80° C and the contact time was approximately 18 hours. The results are tabulated in Table II.

TABLE II

| Materials | | | | | Product | | | | | | |
|---|---|---|---|---|---|---|---|---|---|---|---|
| | | | | | | | | Chemical Analysis | | | |
| Reaction Solvent | Ratio Olefin/ Solvent | Weight PBMO, grams | Adduct Recovered, grams | Mol. Wt. Ebull. in MEK | % of Olefin Reacted Calculated from $I_2$ No. | Ratio N/F % of Theory | Ratio $NF_2/C$, Mol | Total Fluorine, % w | Nitrogen, % w | Carbon, % w | Hydrogen, % w |
| Acetone | 1/16 | 2.80 | 6.01 | 865 | 98.0 | 95 | 0.35 | 35.0 | 12.2 | 32.2 | 4.1 |
| $CCl_4$ | 1/16 | 2.00 | 4.14[1] | — | — | — | — | — | — | — | — |
| $CHCl_3$ | 1/16 | 2.50 | 5.18[1] | — | — | — | — | — | — | — | — |
| Acetone | 1/4 | 4.06 | 8.76 | 920 | 98.6 | 104 | 0.33 | 32.0 | 12.3 | 31.9 | 4.1 |
| Acetone | 1/2 | 4.07 | 8.74 | 910 | 98.8 | 106 | 0.32 | 31.6 | 12.4 | 32.6 | 3.9 |
| Acetone | 1/6 | 5.08 | 10.57 | 900 | 97.8 | 104 | 0.34 | 34.6 | 13.3 | 32.5 | 4.2 |
| Acetone | 1/8 | 4.02 | 8.83 | 835 | 96.2 | 105 | 0.35 | 32.7 | 12.7 | 31.9 | 4.2 |

[1] Adduct used up in Stability tests.

TABLE I

| Reactor Type | Solvent | Duration Hour | Olefin Reacted, % Avail, Total[1] | Ratio $NF_2/C$, Moles | Adduct Properties | |
|---|---|---|---|---|---|---|
| | | | | | Ignition Temp, °C | Impact Sensitivity $Kg/cm^{2)}$ |
| Stainless Steel | Acetone | 18 | 100 | 0.385/1 | 200 | 60 |
| Glass Aerosol Tube | " | 18 | 97 | 0.38/1 | 190 | 60 |
| Magne Dash | " | 3 | 88 | 0.32/1 | 146 | 80 |
| Glass Aerosol Tube | " | 3 | 93 | 0.35/1 | 162 | 100 |
| Stainless Steel | $CCl_4$ | 18 | 97 | 0.31/1 | 122 | 200 |
| Glass Aerosol Tube | " | 18 | 99 | 0.34/1 | 190 | 80 |
| Magne Dash | " | 3 | 83 | 0.27/1 | — | 200 |
| Glass Aerosol Tube | " | 3 | 86 | 0.30/1 | 195 | 200 |

[1] Determined by $I_2$ No. of PBMO and adduct.
[2] n-Propylnitrate = 14.2 Kg/cm.

EXAMPLE II

The example illustrates the preparation of poly(butadiene monoxide)-$N_2F_4$ adducts in various solvents and in various poly(butadiene monoxide) to solvent ratios as well as some of the properties of the resulting adducts.

A PBMO polymer was first prepared as in Example I having a molecular weight of 860, an OH value of 0.15 eq/100 g, and $I_2$ number of 307 and contained 66.4% carbon and 8.7% hydrogen.

Into a stainless steel reactor were placed 2.80 grams of the previously prepared PBMO polymer and acetone in a solvent ratio of 1/16. $N_2F_4$ gas was then introduced and the pressure raised to 500 psi. This pressure and a temperature of about 82°–85° C was then maintained for 18 hours. 6.01 grams of $N_2F_4$-PBMO polymer ad-

EXAMPLE III

The procedure of Example II was essentially repeated wherein $N_2F_4$ was reacted with PBMO at 500 psi and 80° C for three hours using various other solvents. Related high $NF_2/C$ polymers and results were obtained when the solvent employed was tetrahydrofuran, diethyl ether, methylene chloride, ethylene dichloride, tetrafluorodichloroacetone or trifluorotrichloroacetone.

EXAMPLE IV

This example illustrates the curing of PBMO—$NF_2$ prepolymer with tolylene diisocyanate.

A PBMO—$N_2F_4$ prepolymer was first prepared by reacting PBMO with $N_2F_4$ at 500 psi and 80° C in ethylene dichloride for 18 hours.

Equal parts on a mole basis of this previously prepared PBMO—$N_2F_4$ prepolymer and tolylene-2,6-diisocyanate were then mixed together in a glass tube. The tube was then placed in an oil bath at 60° C using a nitrogen atmosphere blanket. After 17 hours a cured dark, taffy-like resin was obtained which may be suitable for binding solid propellants.

The procedure was essentially repeated wherein the PBMO—$N_2F_4$ prepolymer was cured with a 10% mole excess of tolylene-2,6-diisocyanate, using 1,2,6-hexanetriol as a crosslink and ferric acetylacetonate catalyst. Similar results are obtained.

The procedure was repeated wherein the PBMO—$N_2F_4$ prepolymer was mixed with about 40% by weight of either dimethyl or dibutyl phthalate. Rubbery cured polymers were obtained which are suitable as solid propellant binders.

EXAMPLE V

This example illustrates the reaction of PBMO with acetic anhydride followed by the further reaction with $N_2F_4$.

To a mixture of 10 parts of PBMO having a carbon and hydrogen analysis of 66.4% and 8.7%, respectively, a molecular weight of 860, an $I_2$ No. of 307 and a hydroxyl value of 0.15 eq/100 g in 100 parts of dry pyridine cooled in an ice bath was added 40 parts of acetic anhydride, and the mixture was allowed to stand at 2° C for 4 days. The pyridine was removed by distillation at high vacuum. Then 100 parts by volume of cold chloroform was added and the solution was washed two times with cold water. The organic layer was dried over magnesium sulfate and the solvent removed by vacuum distillation. To remove traces of higher boiling solvents, 20 parts by volume of methylene chloride was added and the solution flashed at high vacuum; this procedure was repeated. Final removal of solvent was accomplished by treatment on a Rinco rotating evaporator at 50° C and 1 mm for one hour to give 8.95 parts of an amber liquid having a molecular weight of 980, and $I_2$ No. of 294, a hydroxyl value of 0.03 eq/100 g and contained 65.3% and 8.5% carbon and hydrogen, respectively.

This acetic ester of PBMO was then reacted with $N_2F_4$ in a stainless steel reactor using chloroform solvent in a dilution ratio of 1/16. After 18 hours at 500 psi and 80° C, an adduct having 28.5% by weight of fluorine was obtained. As this adduct was used in stability tests, no further chemical analyses were made.

The process noted above was essentially repeated wherein a PBMO—$N_2F_4$ adduct was subsequently reacted with acetic anhydride. Related results were obtained.

EXAMPLE VI

This example illustrates the preparation of high energy-containing propellant binders wherein PBMO is first reacted with trifluoroacetic anhydride and this product subsequently reacted with $N_2F_4$.

To 5 parts of PBMO in 50 parts by volume of acetonitrile was added 15 parts by volume of trifluoroacetic anhydride at 0° C. This mixture was allowed to stand at room temperature for 21 hours. The mixture was then flashed at about 1 mm and 75° C and three 20 parts by volume portions of methylene chloride were added and successively flashed at 1 mm. Final treatment consisted of heating at 75° C and 1 mm for one hour on a Rinco rotating evaporator. Approximately 6.4 parts of dark amber liquid product was obtained which had the following properties: 53.1% carbon, 6.0% hydrogen, 15.8% fluorine, 0.2% nitrogen, $I_2$ No. of 242, mol wt of 615 and 0.12 eq/100 g of active hydrogen.

Analogous reactions to those above-described were carried out using dioxane, dimethyl sulfoxide, dimethylformamid and nitromethane as solvents. The last three solvents gave more viscous products than did acetonitrile. The dimethyl sulfoxide product contained 2.6% S.

The above prepared trifluoroacetic esters of PBMO were then reacted with $N_2F_4$ essentially as described in Example V. Related results were obtained in each instance. A representative procedure and results are as follows.

4.60 parts of the trifluoroacetic ester of PBMO prepared in acetonitrile were dissolved in acetone in a stainless steel reactor. Then $N_2F_4$ gas at 500 psi was introduced and the reactor held at this pressure and at 80° C for 18 hours. At the end of this time, 8.90 parts of adduct was obtained which is suitable as a binder.

Similar results are obtained when a PBMO–$N_2F_4$ adduct is subsequently reacted ith trifluoroacetic anhydride.

EXAMPLE VII

This example illustrates the preparation and properties of the adduct of 1,2-divinyl ethylene oxide polymer and $N_2F_4$, wherein essentially the same procedure is used as was used to prepare the PBMO—$N_2F_4$ adducts.

3.88 grams of 1,2-divinyl ethylene oxide, 0.338 grams divinyl glycol (initiator) and 0.57 grams $BF_3$ etherate were dissolved in 15 mls methylene chloride and allowed to set at room temperature for about 70 hours. The polymer was treated as in Example I by washing with water and drying over magnesium sulfate. The 3.0 grams of polymer had a molecular weight of 465 and an $I_2$ number of 351.

1.11 g of this polymer in 16 cc acetone were charged to $N_2F_4$ reactor and reactor pressure to 500 psig and temperature raised to 80° C as in Example I. The reaction was continued for 18 hours. On venting reactor and removing the solvent, 2.12 g of light yellow tacky solid was recovered having 35.5% F, 11.0% N, 34.2% C, 3.98% H.

EXAMPLE VIII

This example illustrates the effectiveness of the PBMO—$N_2F_4$ adduct as binders for high energy solid propellants.

Sixty parts of ammonium perchlorate were wetted with 20 parts of binder (PBMO—$N_2F_4$ adduct + 10% mole excess of tolylene-2,6-diisocyanate based on the adduct). Then 20 parts of aluminum powder were added and the mixture thoroughly mixed. The mixture was cast into a glass test tube, evacuated and heated at 60° for 5½ days. The product was a solid of moderate impact sensitivity (40–60 kg cm) and moderate thermal stability which ignited when heated above 226° C.

EXAMPLE IX

This example illustrates the preparation of a cured polymer containing high energy groups which is suitable as a binder for solid propellants which comprises first reacting a hydroxy-terminated polyether with an anhydride to convert the OH groups to carboxyl groups followed by reaction with $N_2F_4$. This resulting polymer is then cured to form the binder.

2.03 g previously prepared PBMO is added to 0.87 g maleic anhydrode in 32 cc total acetone. This mixture was stirred for 3 hours at room temperature and then reacted with $N_2F_4$ at 500 psi and 80° C as in Example I for 18 hours. Approximately 4.65 g product was obtained after removing solvent and heating at 80° C. The IR spectrum indicated absence of OH groups and presence of carbonyl groups.

0.31 g of this product was then reacted with 0.015 g of tris[1-(2-methyl)-aziridinyl] phosphine oxide to effect a cure. A cured plastic solid was obtained in 5 days which analyzed 29.8% fluorine.

EXAMPLE X

This example illustrates the preparation of a polymer containing high energy groups which comprises first reacting a hydroxy-terminated polyether with an organic polyisocyanate followed by reaction with $N_2F_4$.

8.0 g PBMO in 50 cc acetone were added to 4.96 g tolylene diisocyanate in 300 cc acetone (1 eq PBMO to 2 eq TDI), heated to 45° C for 30 minutes and allowed to cool and stand overnight. The mixture was then treated with $N_2F_4$ as described in Example I. After removing solvent, 22.92 g of a tacky dark brown liquid was recovered. IR analysis showed very little OH groups and typical peaks for urethane and isocyanate groups. The product contained 36.6% C, 3.9% H, 31.9% $F_2$ and 13.4% $N_2$.

This product may then be cured with hydroxy-terminated compounds such a polyols, polyoxyalkylene polyols, glycols and the like, such as for example, ethylene glycol and glycerine.

I claim as my invention:

1. A polymer containing high energy groups which comprises the reaction product of a hydroxy-terminated polyether prepared by polymerizing unsaturated epoxide monomers and tetrafluorohydrazine.

2. A polymer as in claim 1 wherein the polyether is poly(butadiene monoxide).

3. A polymer as in claim 1 wherein the polyether is polymerized 1,2-divinyl ethylene oxide.

4. A polymer containing high energy groups which comprises (1) the reaction product of poly(butadiene monoxide) and tetrafluorohydrazine and (2) a curing agent.

5. A polymer as in claim 4 wherein the curing agent is a polyisocyanate.

6. A polymer as in claim 4 wherein the curing agent is a dianhydride.

7. A polymer having a high $NF_2/C$ ratio which is suitable as a solid propellant binder which comprises (1) the reaction product of poly(butadiene monoxide) and tetrafluorohydrazine and (2) tolylene diisocyanate.

8. A polymer containing high energy groups which comprises the reaction product of a (-COOH) - terminated polyether prepared by reacting poly(butadiene monoxide) with maleic anhydride and tetrafluorohydrazine.

9. A polymer containing high energy groups which is suitable as a solid propellant binder which comprises (1) the reaction product of a (-COOH)-terminated polyether prepared by reacting poly(butadiene monoxide), maleic anhydride and tetrafluorohydrazine and (2) a curing agent.

10. A polymer containing high energy groups which comprises the reaction product of a (—NCO)-terminated polyether prepared by reacting poly(butadiene monoxide) and an organic polyfunctional isocyanate and tetrafluorohydrazine.

11. A polymer as in claim 10 wherein the organic polyfunctional isocyanate is tolylene diisocyanate.

12. A polymer having a high $NF_2/C$ ratio and which is suitable as a solid propellant binder which comprises (1) the reaction product of a (—NCO)-terminated polyether prepared by reacting poly(butadiene monoxide), an organic polyfunctional isocyanate and tetrafluorohydrazine and (2) a curing agent.

13. A polymer as in claim 12 wherein the curing agent is an organic polyol.

* * * * *